(12) United States Patent
Uchiyama et al.

(10) Patent No.: US 12,476,434 B2
(45) Date of Patent: Nov. 18, 2025

(54) SEMICONDUCTOR LASER DEVICE AND METHOD FOR MANUFACTURING THE SAME

(71) Applicant: Mitsubishi Electric Corporation, Tokyo (JP)

(72) Inventors: Asami Uchiyama, Tokyo (JP); Takeshi Yamatoya, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 520 days.

(21) Appl. No.: 18/004,639

(22) PCT Filed: Oct. 13, 2020

(86) PCT No.: PCT/JP2020/038658
§ 371 (c)(1),
(2) Date: Jan. 6, 2023

(87) PCT Pub. No.: WO2022/079808
PCT Pub. Date: Apr. 21, 2022

(65) Prior Publication Data
US 2023/0253759 A1    Aug. 10, 2023

(51) Int. Cl.
*H01S 5/026* (2006.01)
*H01S 5/06* (2006.01)
*H01S 5/068* (2006.01)

(52) U.S. Cl.
CPC .......... *H01S 5/0265* (2013.01); *H01S 5/0601* (2013.01); *H01S 5/0617* (2013.01); *H01S 5/06804* (2013.01); *H01S 5/06808* (2013.01)

(58) Field of Classification Search
CPC .... H01S 5/0265; H01S 5/0601; H01S 5/0617; H01S 5/06804; H01S 5/06808
See application file for complete search history.

(56) References Cited

U.S. PATENT DOCUMENTS

| | | | | |
|---|---|---|---|---|
| 5,917,637 A | * | 6/1999 | Ishikawa | ................ H04B 10/00 372/29.014 |
| 7,573,928 B1 | * | 8/2009 | Pezeshki | ............... H01S 5/0265 372/43.01 |

(Continued)

FOREIGN PATENT DOCUMENTS

| | | |
|---|---|---|
| JP | H03-192787 A | 8/1991 |
| JP | H05-021900 A | 1/1993 |

(Continued)

OTHER PUBLICATIONS

International Search Report issued in PCT/JP2020/038658; mailed Dec. 22, 2020.

(Continued)

*Primary Examiner* — James A Menefee
(74) *Attorney, Agent, or Firm* — Studebaker Brackett PLLC

(57) ABSTRACT

A modulator-integrated semiconductor laser (100) includes a semiconductor laser (101), an electro-absorption modulator (102), and an optical attenuator (103) that are monolithically integrated. The electro-absorption modulator (102) and the optical attenuator (103) are connected in series in a stage succeeding the semiconductor laser (101). A control unit (44) controls the DC bias voltage to be applied to the optical attenuator (103) to increase as temperature of the modulator-integrated semiconductor laser (100) rises.

19 Claims, 18 Drawing Sheets

(56) References Cited

U.S. PATENT DOCUMENTS

| | | | |
|---|---|---|---|
| 2002/0075549 A1* | 6/2002 | Ash | H01S 5/06804 359/254 |
| 2005/0249509 A1 | 11/2005 | Nagarajan et al. | |
| 2011/0085796 A1* | 4/2011 | Motohiro | H04B 10/50595 398/25 |

FOREIGN PATENT DOCUMENTS

| JP | H11-186661 A | | 7/1999 |
|---|---|---|---|
| JP | 2003229636 A | * | 8/2003 |
| JP | 2005129824 A | * | 5/2005 |
| JP | 2005-142230 A | | 6/2005 |
| JP | 2007-158204 A | | 6/2007 |
| JP | 2007-532980 A | | 11/2007 |
| JP | 2008-066406 A | | 3/2008 |
| JP | 2010-206121 A | | 9/2010 |
| JP | 2011-086683 A | | 4/2011 |
| JP | 2011-181789 A | | 9/2011 |
| JP | 2012-209583 A | | 10/2012 |
| JP | 2013-254112 A | | 12/2013 |
| JP | 2019-047053 A | | 3/2019 |

OTHER PUBLICATIONS

An Office Action; "Notice of Reasons for Refusal", mailed by the Japanese Patent Office on May 11, 2021, which corresponds to Japanese Patent Application No. 2021-506772 with Partial English language translation.

* cited by examiner

SEMICONDUCTOR LASER DEVICE AND METHOD FOR MANUFACTURING THE SAME

FIELD

The present disclosure relates to a semiconductor laser device and a method for manufacturing the same.

BACKGROUND

In a conventional uncooled type modulator-integrated semiconductor laser, two electro-absorption modulators respectively having different absorption end wavelengths have been integrated in series. The electro-absorption modulators have respectively modulated laser light beams in different temperature ranges, thereby implementing driving in a wide temperature range (see, e.g., PTL 1).

CITATION LIST

Patent Literature

[PTL 1] JP 2005-142230 A

SUMMARY

Technical Problem

However, in the conventional technique, complicated electric wiring has been required to switch an input of a modulated signal to two EA modulators at the time of uncooled use.

As a semiconductor laser rises in temperature, its light output decreases. Therefore, in the conventional modulator-integrated semiconductor laser, a DC bias current of the semiconductor laser has been required to be significantly reduced on the low temperature side to keep an average light output of an emission end surface constant regardless of temperature. There has been a problem that laser oscillation becomes unstable at the time of high-speed modulation when the DC bias current of the semiconductor laser is low and a modulation waveform deteriorates due to return light from the emission end surface or another device, for example.

The present disclosure has been made to solve the above-described problem, and is directed to obtaining a semiconductor laser device capable of modulating an uncooled type modulator-integrated semiconductor laser at high speed in a wide temperature range without providing complicated electric wiring and a method for manufacturing the same.

Solution to Problem

A semiconductor laser device according to the present disclosure includes: a modulator-integrated semiconductor laser including a semiconductor laser, an electro-absorption modulator, and an optical attenuator that are monolithically integrated, the electro-absorption modulator and the optical attenuator being connected in series in a stage succeeding the semiconductor laser; and a control unit controlling the DC bias voltage to be applied to the optical attenuator to increase as temperature of the modulator-integrated semiconductor laser rises.

Advantageous Effects of Invention

In the present disclosure, the DC bias voltage to be applied to the optical attenuator is controlled to increase as temperature of the modulator-integrated semiconductor laser rises. As a result, the average light output from the emission end surface of the modulator-integrated semiconductor laser becomes constant regardless of the temperature. The DC bias current of the semiconductor laser need not be reduced on the low temperature side. Accordingly, a modulation waveform does not deteriorate at the time of high-speed modulation. Accordingly, the uncooled type modulator-integrated semiconductor laser can be modulated at high speed in a wide temperature range without being provided with complicated electric wiring.

DESCRIPTION OF EMBODIMENTS

A semiconductor laser device and a method for manufacturing the same according to the embodiments of the present disclosure will be described with reference to the drawings. The same components will be denoted by the same symbols, and the repeated description thereof may be omitted.

Embodiment 1

Figure 1:
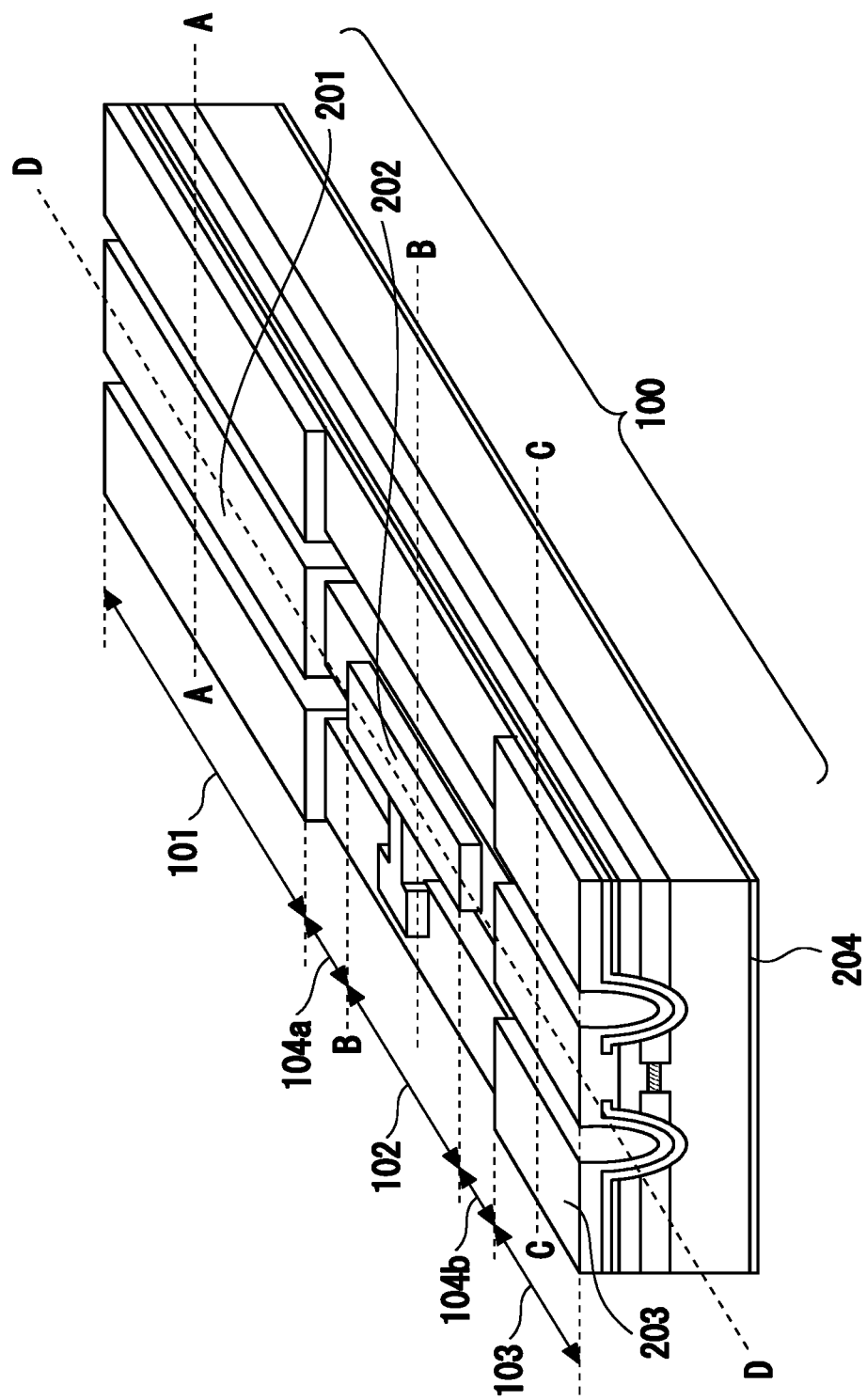
FIG. 1 is a perspective view illustrating a modulator-integrated semiconductor laser according to an embodiment 1.

FIG. 1 is a perspective view illustrating a modulator-integrated semiconductor laser according to an embodiment 1. A modulator-integrated semiconductor laser 100 is of an uncooled type having no temperature adjustment device, and includes a semiconductor laser 101, an EA (electro-absorption) modulator 102, and an optical attenuator 103 that are monolithically integrated on one semiconductor substrate. The semiconductor laser 101 is a DFB-LD (distributed feedback laser diode). The electro-absorption modulator 102 and the optical attenuator 103 are connected in series in a stage succeeding the semiconductor laser 101. Separation regions 104a and 104b for electrical separation are respectively provided among the semiconductor laser 101, the electro-absorption modulator 102, and the optical attenuator 103.

The semiconductor laser 101 has a front surface electrode 201, the electro-absorption modulator 102 has a front surface electrode 202, and the optical attenuator 103 has a front surface electrode 203. To input a high-speed modulated signal to the electro-absorption modulator 102, the size of the front surface electrode 202 needs to be reduced. On the other hand, the optical attenuator 103 is a DC drive. To improve heat dissipation, the size of the front surface electrode 203 and its contact area with a contact layer may be large. Therefore, the area of the front surface electrode 203 in the optical attenuator 103 is preferably wider than the area of the front surface electrode 202 in the electro-absorption modulator 102. The semiconductor laser 101, the electro-absorption modulator 102, and the optical attenuator 103 have a common rear surface electrode 204.

Figure 2:
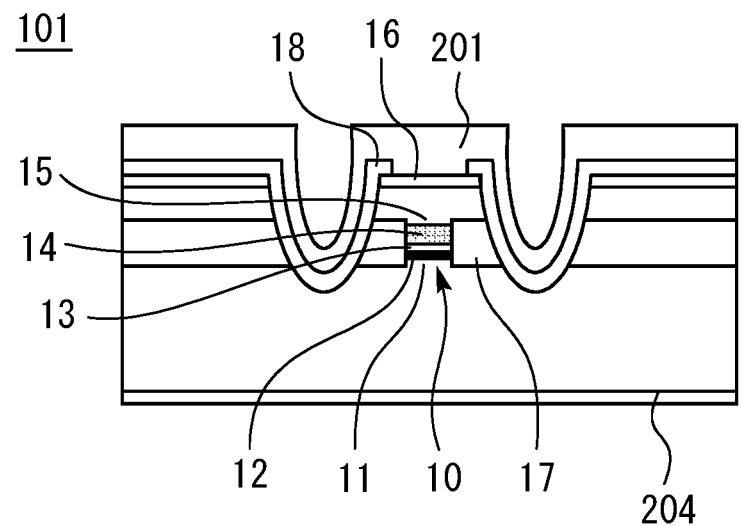
FIG. 2 is a cross-sectional view of the semiconductor laser taken along a line A-A illustrated in FIG. 1.

FIG. 2 is a cross-sectional view of the semiconductor laser taken along a line A-A illustrated in FIG. 1. A mesa stripe 10 is formed in a direction of an optical axis of a laser light beam. The semiconductor laser 101 includes an n-type cladding layer 11, a diffraction grating layer 12, an n-type cladding layer 13, an active layer 14, a p-type cladding layer 15, a contact layer 16, a current blocking layer 17, an insulating film 18, the front surface electrode 201, and the rear surface electrode 204. The active layer 14 has a multi-quantum-well structure.

Figure 3:
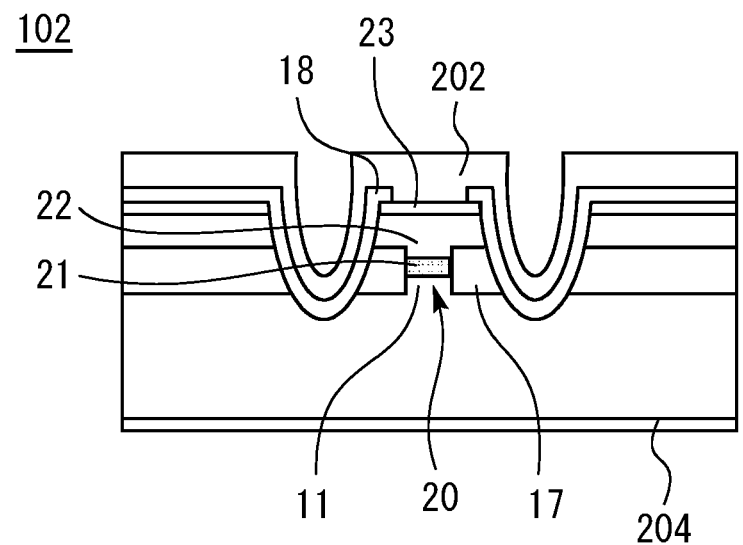
FIG. 3 is a cross-sectional view of the electro-absorption modulator taken along a line B-B illustrated in FIG. 1.

FIG. 3 is a cross-sectional view of the electro-absorption modulator taken along a line B-B illustrated in FIG. 1. A mesa stripe 20 is formed continuously from the mesa stripe 10 in the direction of the optical axis of the laser light beam. The electro-absorption modulator 102 includes an n-type cladding layer 11, a light absorption layer 21, a p-type cladding layer 22, a contact layer 23, a current blocking layer 17, an insulating film 18, the front surface electrode 202, and the rear surface electrode 204. The light absorption layer 21 has a multi-quantum-well structure.

Figure 4:
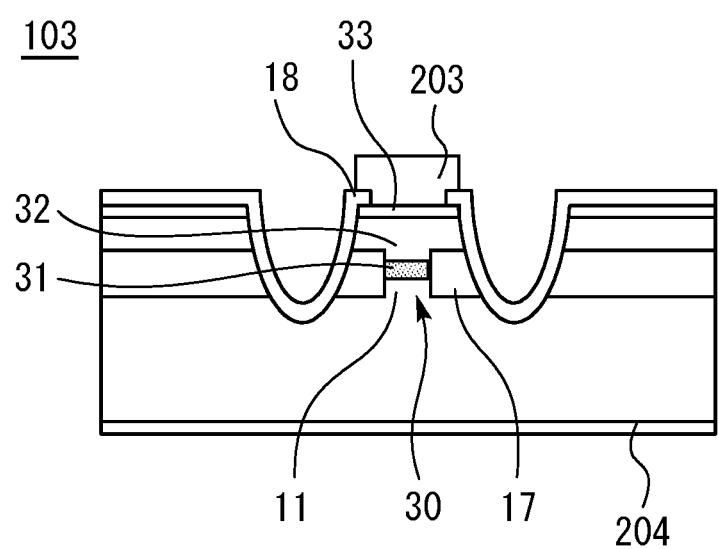
FIG. 4 is a cross-sectional view of the optical attenuator taken along a line C-C illustrated in FIG. 1.

FIG. 4 is a cross-sectional view of the optical attenuator taken along a line C-C illustrated in FIG. 1. A mesa stripe 30 is formed continuously from the mesa stripes 10 and 20 in the direction of the optical axis of the laser light beam. The optical attenuator 103 includes an n-type cladding layer 11, a light absorption layer 31, a p-type cladding layer 32, a contact layer 33, a current blocking layer 17, an insulating film 18, the front surface electrode 203, and the rear surface electrode 204. The light absorption layer 31 also has a multi-quantum-well structure, and attenuates a light output by an electro-absorption effect, like the light absorption layer 21 in the electro-absorption modulator 102.

Figure 5:
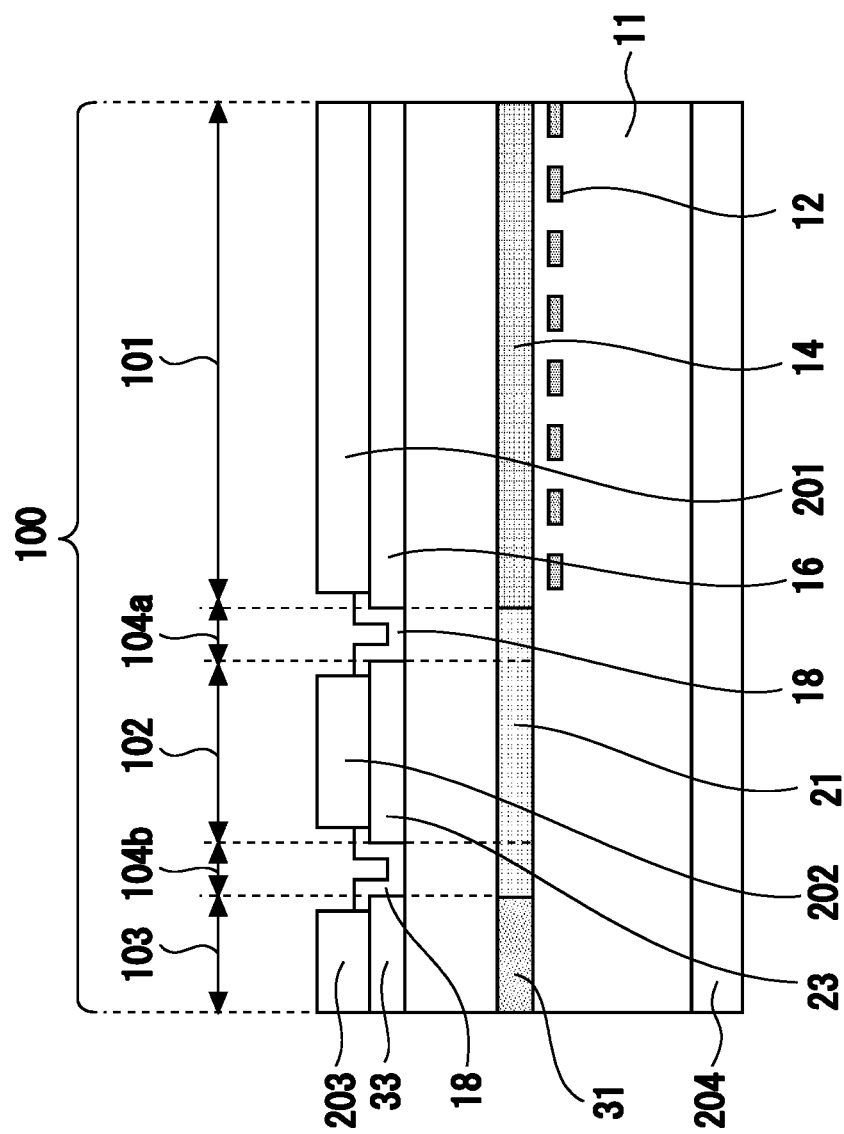
FIG. 5 is a cross-sectional view taken along a line D-D illustrated in FIG. 1.

FIG. 5 is a cross-sectional view taken along a line D-D illustrated in FIG. 1. The semiconductor laser 101, the separation region 104a, the electro-absorption modulator 102, the separation region 104b, and the optical attenuator 103 are connected in series in the direction of the optical axis of the laser light beam. In each of the separation regions 104a and 104b, a contact layer and an electrode are removed, and an insulating film 18 is provided on its surface. The mesa stripes are continuously formed.

Although the optical attenuator 103 has an embedded structure with the current blocking layer 17 made of a semi-insulating material in this example, the optical attenuator 103 may have a transistor structure in which p–, n–, and p-types or n–, p–, n-types are laminated and a thyristor structure in which n–, p–, n–, and p-types or p–, n–, p–, and n-types are laminated. Not the embedded structure but a ridge type structure or a high-mesa type structure may be used. Not only the embedded structure but also another structure may be applied to each of the semiconductor laser 101 and the electro-absorption modulator 102. Although a case using an n-type substrate containing the n-type cladding layer 11 is illustrated in this example, a p-type substrate may be used.

Figure 6:
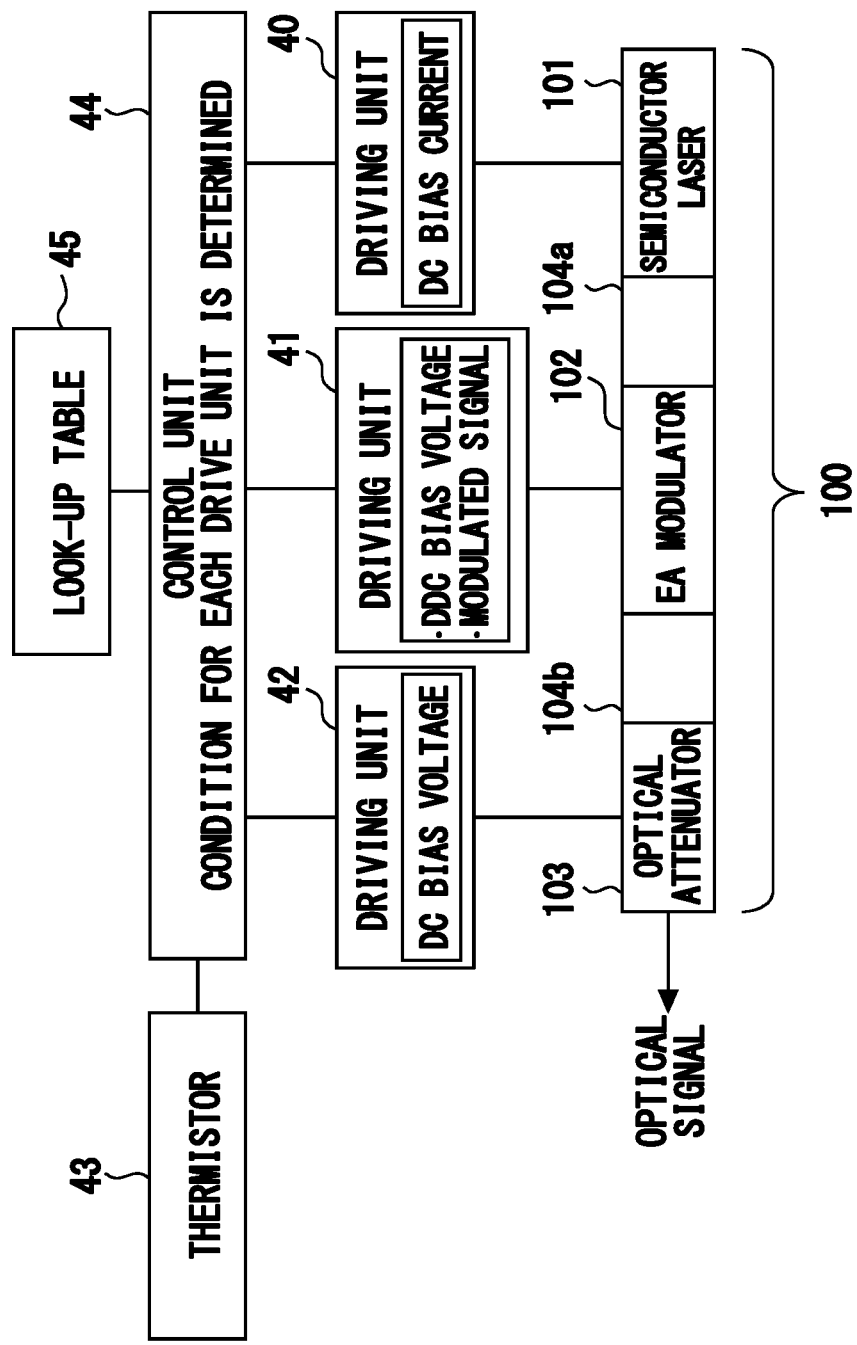
FIG. 6 is a block diagram illustrating the semiconductor laser device according to the embodiment 1.

FIG. 6 is a block diagram illustrating the semiconductor laser device according to the embodiment 1. A driving unit 40 applies a DC bias current to the semiconductor laser 101. A driving unit 41 applies a DC bias voltage and a modulated signal to the electro-absorption modulator 102. A driving unit 42 applies a DC bias voltage to the optical attenuator 103. A thermistor 43 detects a temperature of the modulator-integrated semiconductor laser 100. A control unit 44 reads a value of a look-up table 45 depending on the temperature detected by the thermistor 43, to control the current and voltage of each of the driving units 40, 41, and 42.

Figure 7:
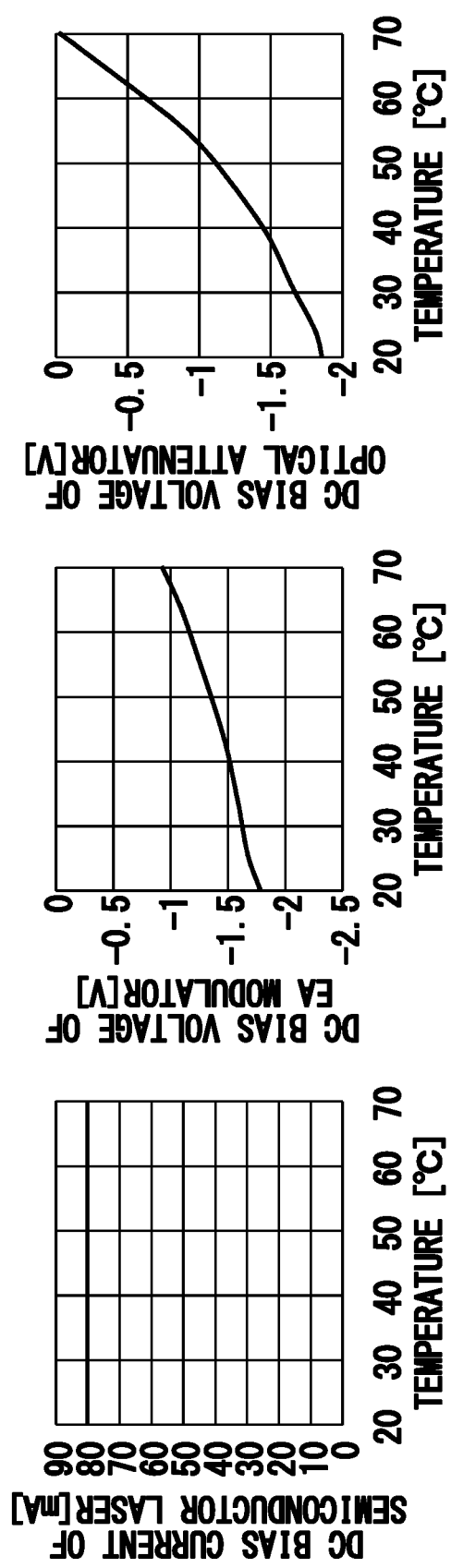
FIG. 7 is a diagram illustrating such a temperature dependence of the current and voltage of each of the units that an average light output from an emission end surface of the modulator-integrated semiconductor laser according to the embodiment 1 becomes constant.

FIG. 7 is a diagram illustrating such a temperature dependence of the current and voltage of each of the units that an average light output from an emission end surface of the modulator-integrated semiconductor laser according to the embodiment 1 becomes constant. The DC bias current of the semiconductor laser 101 is constant regardless of temperature. The DC bias voltage of the electro-absorption modulator 102 is selected such that an extinction ratio at each temperature becomes constant. The DC bias voltage of the optical attenuator 103 is selected such that the average light output becomes constant under such a condition.

Figure 8:
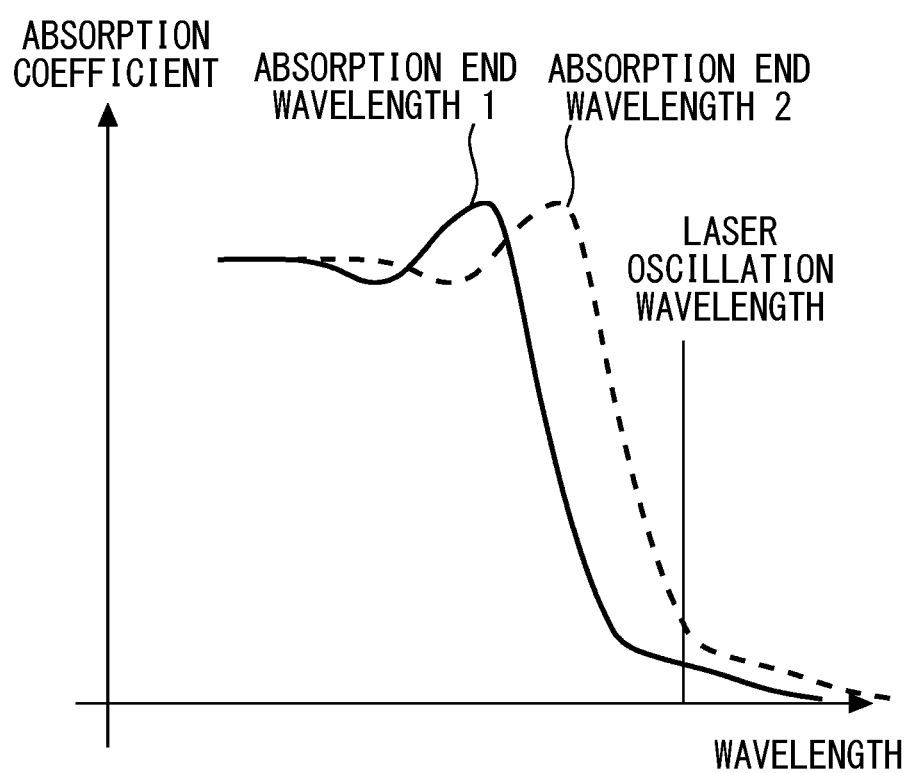
FIG. 8 is a diagram illustrating respective wavelength dependences of two types of absorption coefficients and a laser oscillation wavelength.

FIG. 8 is a diagram illustrating respective wavelength dependences of two types of absorption coefficients and a laser oscillation wavelength. Generally, if a difference between the laser oscillation wavelength and an absorption end wavelength, such as the absorption end wavelength 1, is large, the absorption coefficient in the laser oscillation wavelength decreases. If a difference between the laser oscillation wavelength and an absorption end wavelength, such as the absorption end wavelength 2, is small, the absorption coefficient in the laser oscillation wavelength increases. Accordingly, when the difference between the laser oscillation wavelength and the absorption end wavelength is increased, a loss can be reduced. On the other hand, if the loss is small, an extinction ratio at the same voltage decreases. In the case of the optical attenuator 103 to be driven with the DC bias voltage, a relatively high voltage can be applied thereto. However, the electro-absorption modulator 102 requires driving by a modulated signal having a low amplitude voltage, whereby the difference between the laser oscillation wavelength and the absorption end wavelength needs to be reduced. Accordingly, the absorption end wavelength of the light absorption layer 31 in the optical attenuator 103 is preferably shorter than the absorption end wavelength of the light absorption layer 21 in the electro-absorption modulator 102. This makes it possible to reduce a loss of the light output.

The temperature dependence of the current and voltage of each of the units illustrated in FIG. 7 is obtained by inspection at the time of manufacture, and a driving condition at each temperature is stored in the look-up table 45. When a condition under which a range of the DC bias voltage of the optical attenuator 103 is wider than a range of the DC bias voltage of the electro-absorption modulator 102 is set, a decrease in light output variation between temperatures and a decrease in loss of light are easily compatible with each other.

Figure 9:
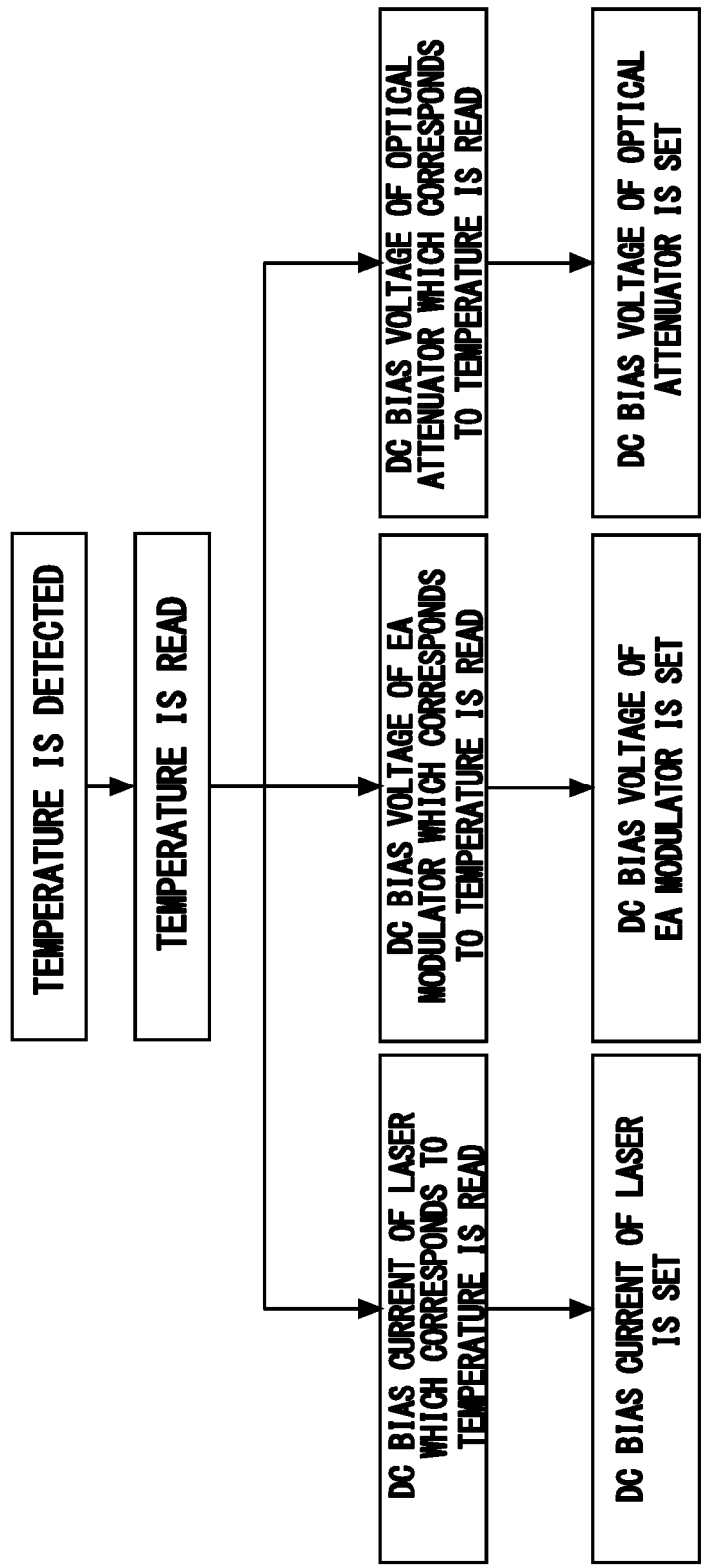
FIG. 9 is a diagram illustrating an adjustment algorithm of a bias current of the semiconductor laser according to the embodiment 1 and respective DC bias voltages of the electro-absorption modulator and the optical attenuator.

FIG. 9 is a diagram illustrating an adjustment algorithm of a bias current of the semiconductor laser according to the embodiment 1 and respective DC bias voltages of the electro-absorption modulator and the optical attenuator. First, the thermistor 43 detects a temperature of the modulator-integrated semiconductor laser 100. Then, the control unit 44 reads the detected temperature, and reads a DC bias current of the semiconductor laser 101 and respective DC bias voltages of the electro-absorption modulator 102 and the optical attenuator 103, which correspond to the temperature, from the look-up table 45. The control unit 44 sets the DC bias current of the semiconductor laser 101 and the respective DC bias voltages of the electro-absorption modulator 102 and the optical attenuator 103 to respectively have read values. A graph illustrated in FIG. 7 is a function that monotonously increases with respect to a temperature within a designated range, thereby making it possible to set unique voltage and current values. This function is obtained by inspection for each device. Although a condition under which the DC bias current of the semiconductor laser 101 is constant is set in the present embodiment, the DC bias current may be adjusted depending on the temperature.

When the modulator-integrated semiconductor laser 100 according to the present embodiment is manufactured, the light absorption layer 31 in the optical attenuator 103 and the light absorption layer 21 in the electro-absorption modulator 102 are integrated by butt joint growth. Alternatively, the light absorption layer 31 in the optical attenuator 103 and the light absorption layer 21 in the electro-absorption modulator 102 are simultaneously epitaxially grown using a selective growth mask.

In the present embodiment, control is performed such that the more the temperature of the modulator-integrated semiconductor laser 100 rises, the higher the DC bias voltage to be applied to the optical attenuator 103 becomes. As a result, the average light output from the emission end surface of the modulator-integrated semiconductor laser 100 becomes constant regardless of the temperature. The DC bias current of the semiconductor laser need not be reduced on the low temperature side. Accordingly, a modulation waveform does not deteriorate at the time of high-speed modulation. Accordingly, the uncooled type modulator-integrated semiconductor laser 100 can be modulated at high speed in a wide temperature range without being provided with complicated electric wiring.

Embodiment 2

Figure 10:
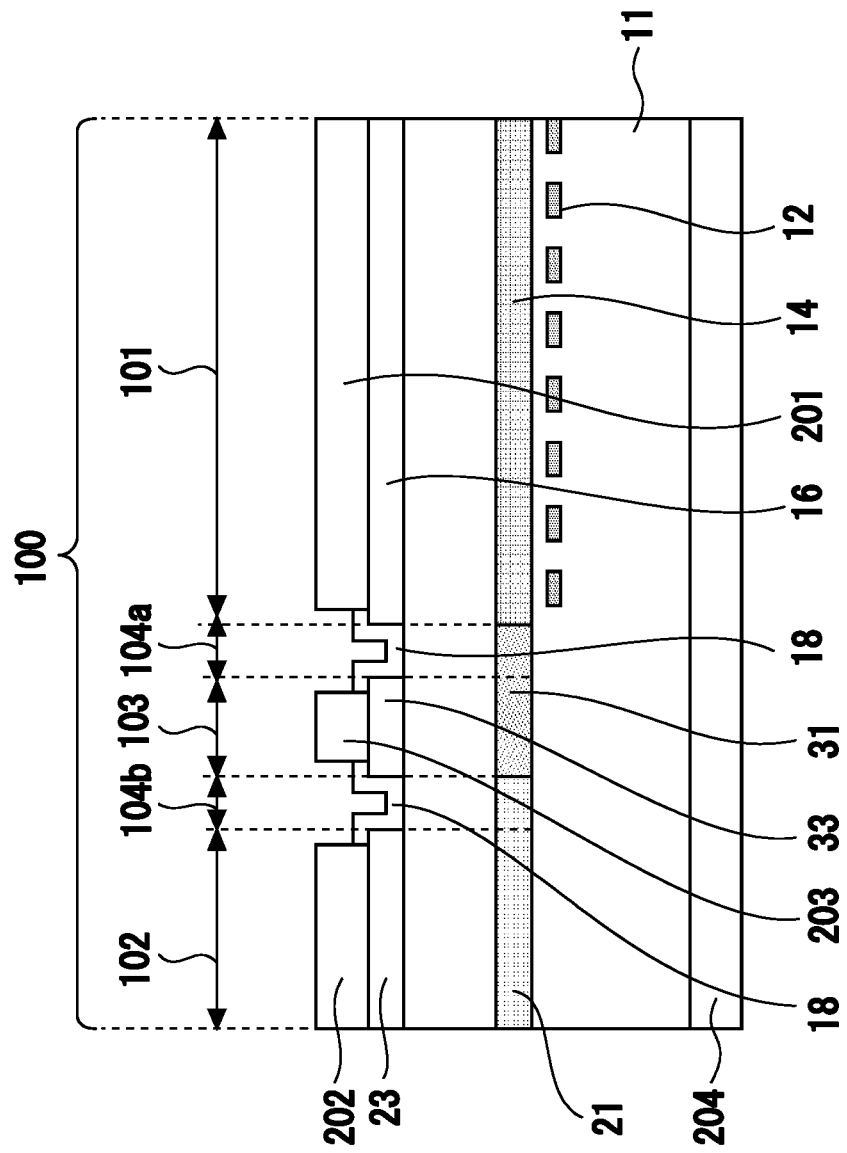
FIG. 10 is a cross-sectional view illustrating a modulator-integrated semiconductor laser according to an embodiment 2.

FIG. 10 is a cross-sectional view illustrating a modulator-integrated semiconductor laser according to an embodiment 2. Although the optical attenuator 103 is integrated in a stage succeeding the electro-absorption modulator 102 in the embodiment 1, an optical attenuator 103 is integrated in a stage preceding an electro-absorption modulator 102 in the present embodiment. The optical attenuator 103 attenuates output light of a semiconductor laser 101. The electro-absorption modulator 102 modulates output light of the optical attenuator 103. The output light of the electro-absorption modulator 102 is outputted from an emission end surface of a modulator-integrated semiconductor laser 100. This makes it possible to reduce the intensity of an optical signal to be inputted to the electro-absorption modulator 102 to an appropriate level, thereby more reducing noise of a modulated optical signal than in the embodiment 1.

Figure 11:
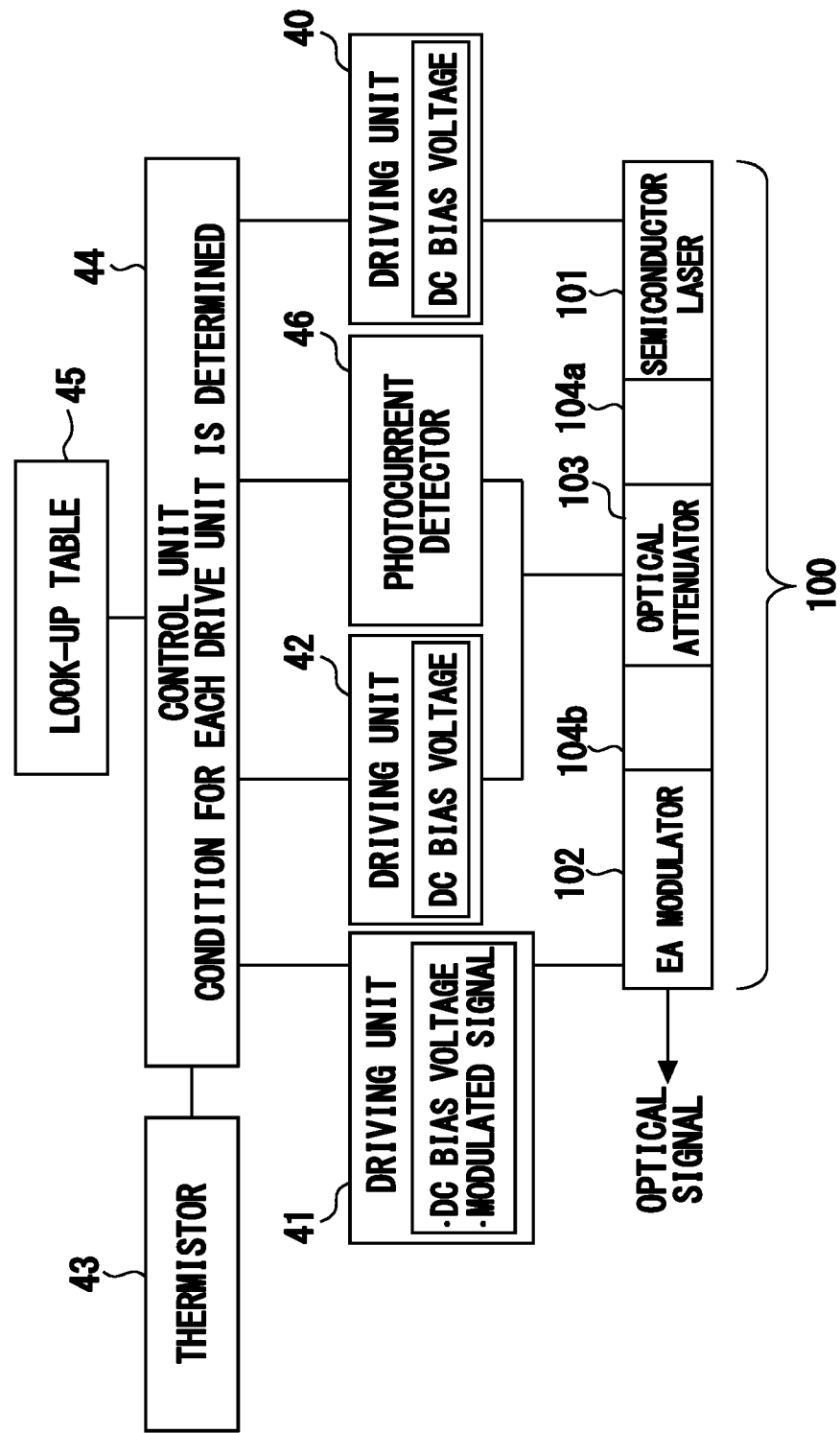
FIG. 11 is a block diagram illustrating a semiconductor laser device according to the embodiment 2.

FIG. 11 is a block diagram illustrating a semiconductor laser device according to the embodiment 2. A photocurrent detector 46 detects a photocurrent following through the optical attenuator 103. A control unit 44 reads a value of a look-up table 45 depending on the detected photocurrent, and sets a current and voltage of each of the units.

Figure 12:
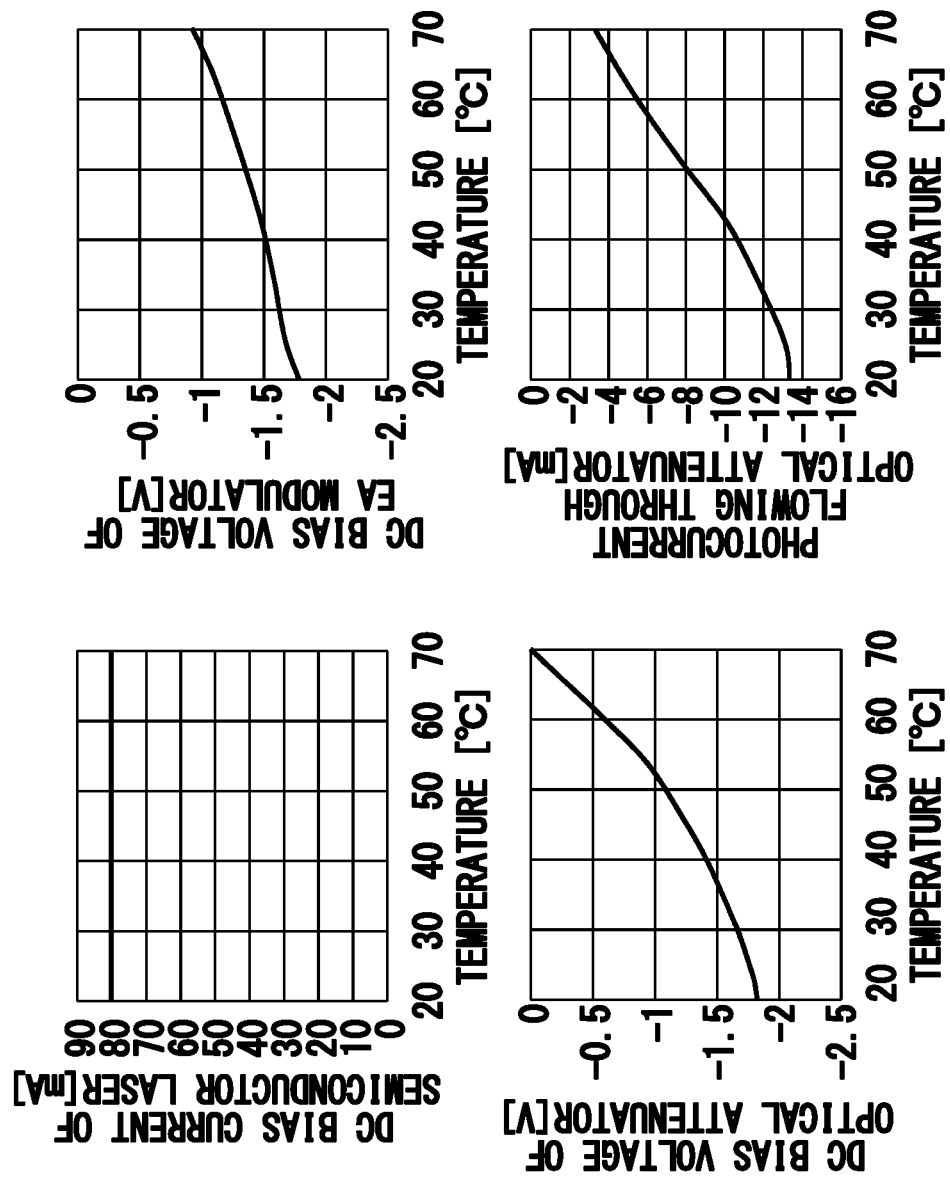
FIG. 12 is a diagram illustrating such a temperature dependence of the current and voltage of each of the units that an average light output from the emission end surface of the modulator-integrated semiconductor laser according to the embodiment 2 becomes constant.

FIG. 12 is a diagram illustrating such a temperature dependence of the current and voltage of each of the units that an average light output from the emission end surface of the modulator-integrated semiconductor laser according to the embodiment 2 becomes constant. The photocurrent is measured with a DC bias voltage optimized at each temperature applied to the optical attenuator 103. Respective temperature dependences of a DC bias current of the semiconductor laser 101, a DC bias voltage of the electro-absorption modulator 102, a DC bias voltage of the optical attenuator 103, and the photocurrent flowing through the optical attenuator 103 are obtained by inspection at the time of manufacture.

Figure 13:
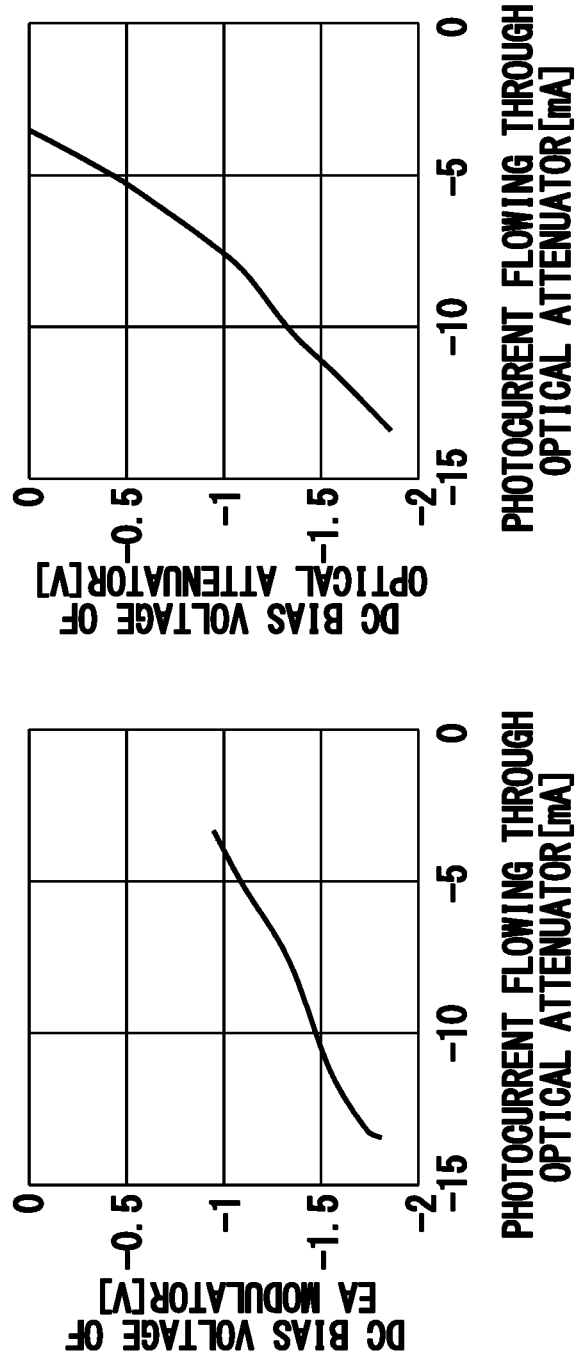
FIG. 13 is a diagram illustrating respective photocurrent dependences of the DC bias voltages of the electro-absorption modulator and the optical attenuator.

FIG. 13 is a diagram illustrating respective photocurrent dependences of the DC bias voltages of the electro-absorption modulator and the optical attenuator. From a graph illustrated in FIG. 12, each of the respective DC bias voltages of the electro-absorption modulator 102 and the optical attenuator 103 is converted into a function of the photocurrent, and is stored in the look-up table 45.

Figure 14:
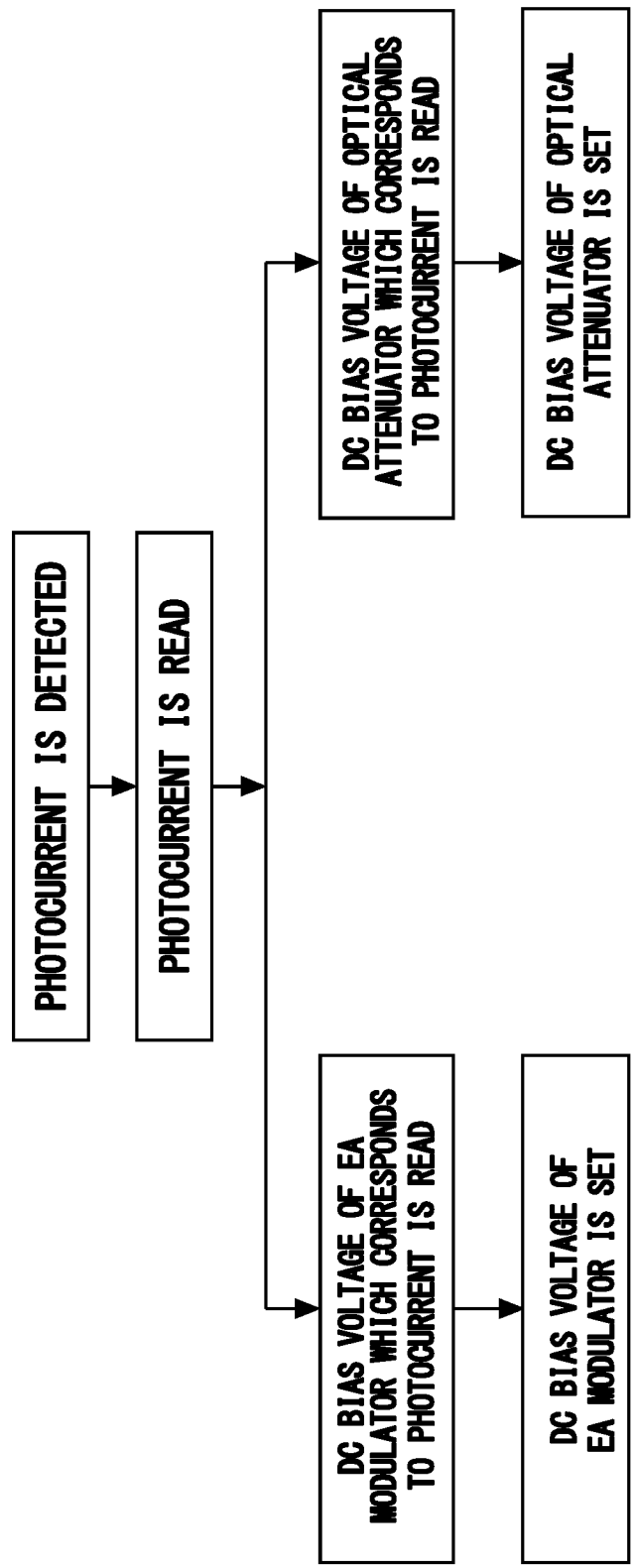
FIG. 14 is a diagram illustrating an adjustment algorithm of respective DC bias voltages of the electro-absorption modulator and the optical attenuator according to the embodiment 2.

FIG. 14 is a diagram illustrating an adjustment algorithm of respective DC bias voltages of the electro-absorption modulator and the optical attenuator according to the embodiment 2. First, the photocurrent detector 46 detects a photocurrent flowing through the optical attenuator 103. Then, the control unit 44 reads the detected photocurrent, and reads respective DC bias voltages of the electro-absorption modulator 102 and the optical attenuator 103, which correspond to the photocurrent, from the look-up table 45. The control unit 44 sets the DC bias voltages of the electro-absorption modulator 102 and the optical attenuator 103 to respectively have read values. A graph illustrated in FIG. 13 is a function that monotonously increases with respect to a photocurrent within a designated range, thereby making it possible to set a unique voltage value for the photocurrent.

Embodiment 3

Figure 15:
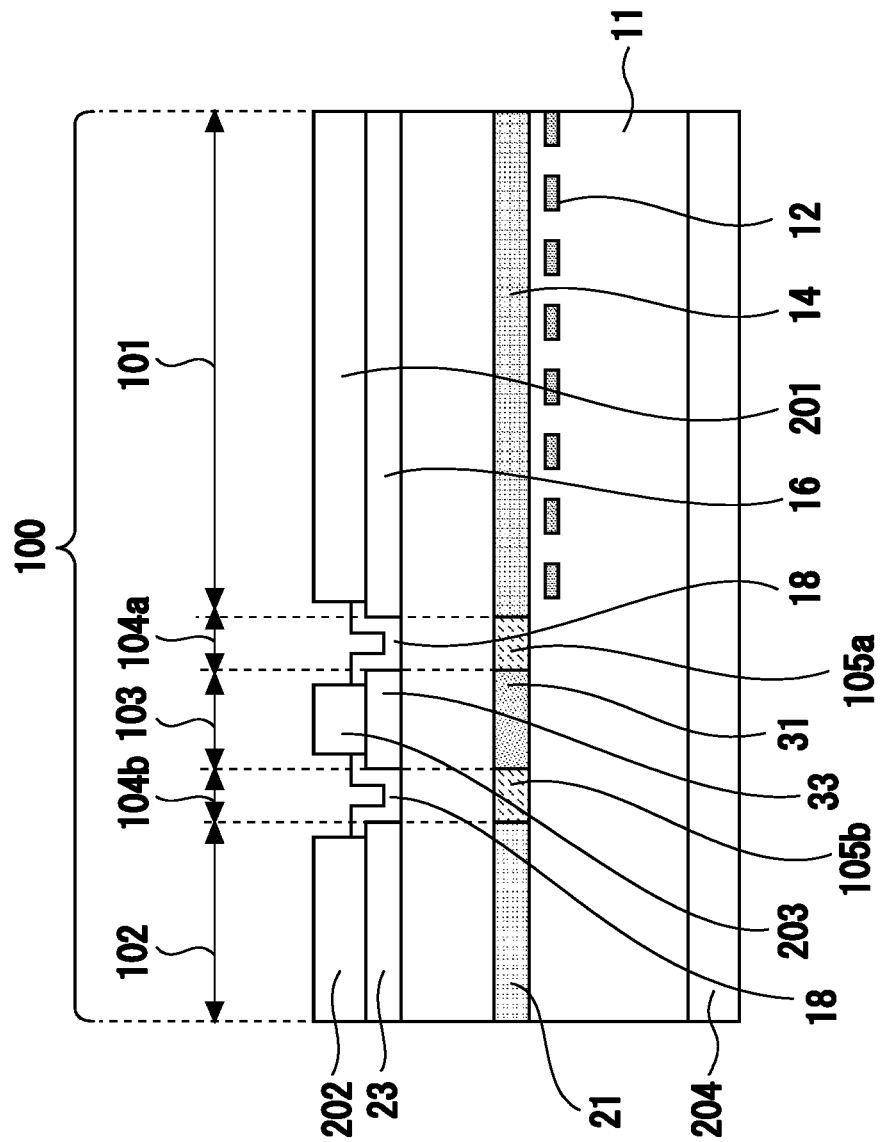
FIG. 15 is a cross-sectional view illustrating a modulator-integrated semiconductor laser according to an embodiment 3.

FIG. 15 is a cross-sectional view illustrating a modulator-integrated semiconductor laser according to an embodiment 3. A separation region 104a between a semiconductor laser 101 and an optical attenuator 103 and a separation region 104b between the optical attenuator 103 and an electro-absorption modulator 102 are respectively provided with transparent waveguides 105a and 105b as passive waveguides. Although both regions are respectively provided with the passive waveguides, only one of them may be provided with a passive waveguide. Although the electro-absorption modulator 102 is a light emission end surface, a passive waveguide may be provided between the electro-absorption modulator 102 and an emission end surface. That is, a passive waveguide is provided between any two of the semiconductor laser 101, the electro-absorption modulator 102, the optical attenuator 103, and the emission end surface. This makes it possible to reduce a loss of light within the waveguide. A window structure for reducing a reflectivity of the end surface may be provided between the electro-absorption modulator 102 and the emission end surface.

Figure 16:
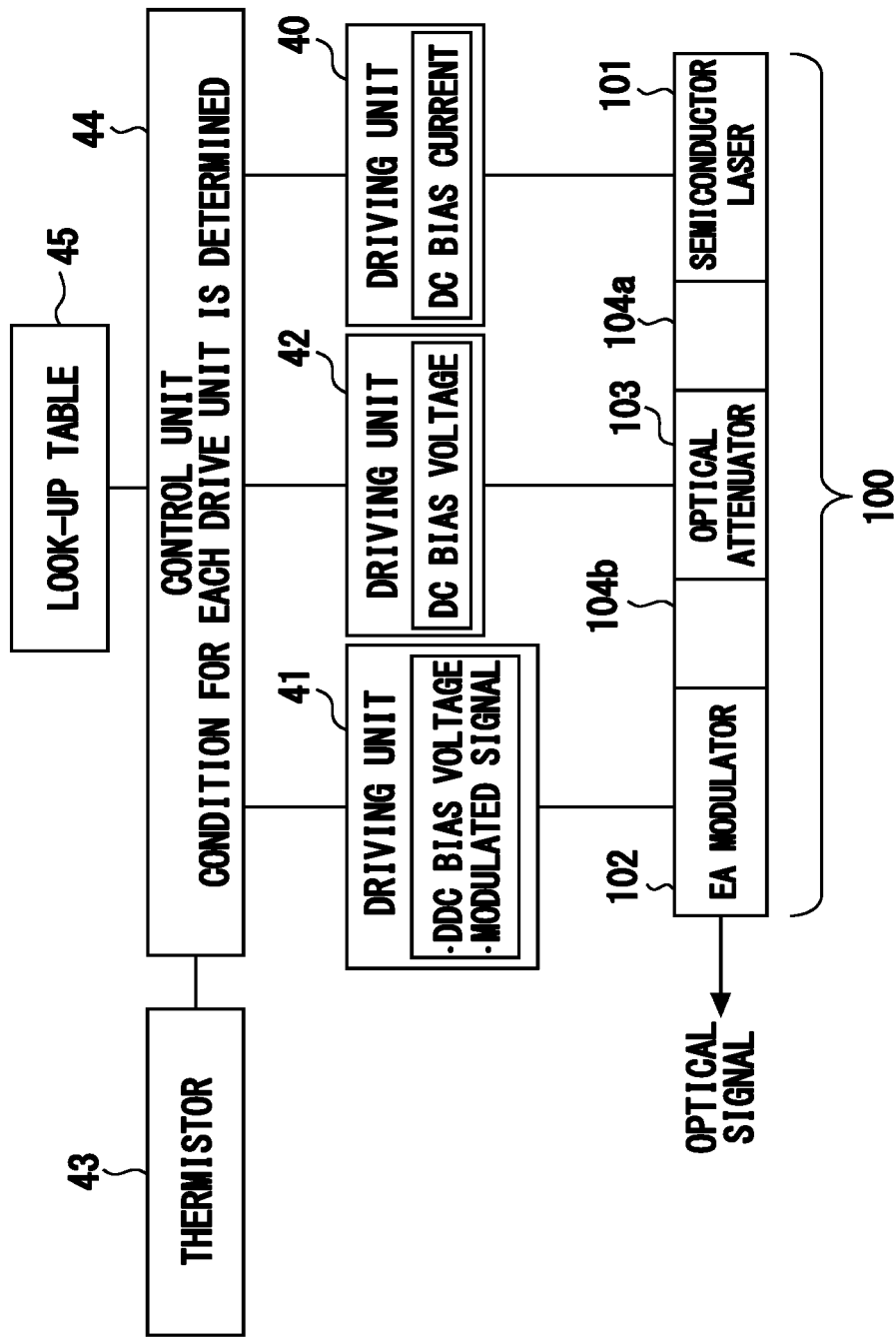
FIG. 16 is a block diagram illustrating a semiconductor laser device according to the embodiment 3.

FIG. 16 is a block diagram illustrating a semiconductor laser device according to the embodiment 3. A control unit 44 reads a value of a look-up table depending on a temperature detected by a thermistor 43, and sets the current and voltage of each of the units.

Figure 17:
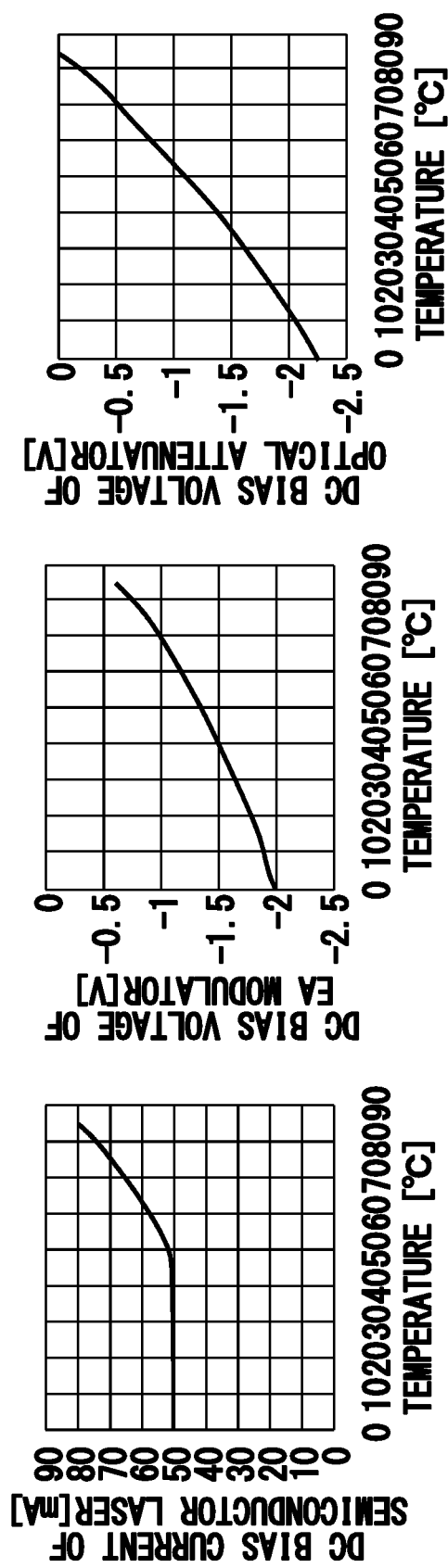
FIG. 17 is a diagram illustrating such a temperature dependence of the current and voltage of each of the units that an average light output from the emission end surface of the modulator integrated semiconductor laser according to the embodiment 3 becomes constant.

FIG. 17 is a diagram illustrating such a temperature dependence of the current and voltage of each of the units that an average light output from the emission end surface of the modulator integrated semiconductor laser according to the embodiment 3 becomes constant. In the present embodiment, a DC bias current of the semiconductor laser 101 is also adjusted depending on a temperature. This makes it possible to set the average light output to a target value within a wider temperature range.

Embodiment 4

Figure 18:
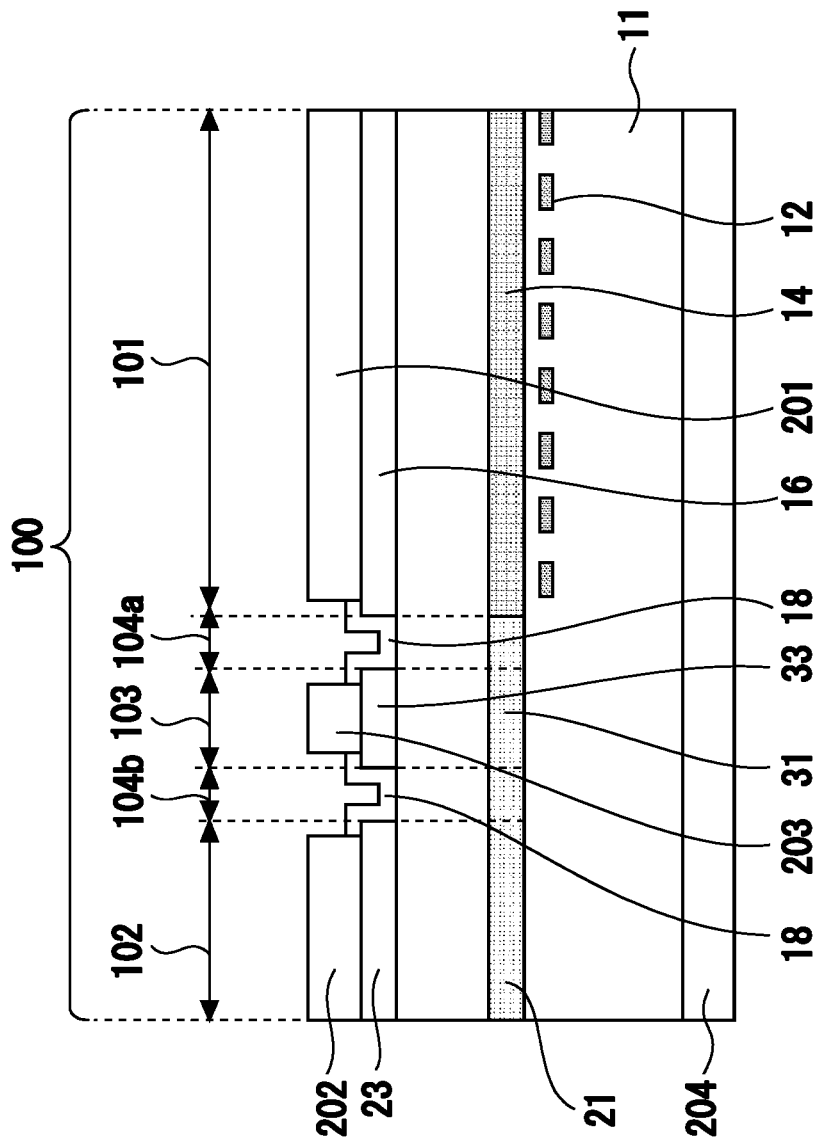
FIG. 18 is a cross-sectional view illustrating a modulator-integrated semiconductor laser according to an embodiment 4.

FIG. 18 is a cross-sectional view illustrating a modulator-integrated semiconductor laser according to an embodiment 4. In the present embodiment, respective layer structures of a light absorption layer 21 in an electro-absorption modulator 102 and a light absorption layer 31 in an optical attenuator 103 are the same. In this case, the light absorption layer 31 in the optical attenuator 103 and the light absorption layer 21 in the electro-absorption modulator 102 can be simultaneously epitaxially grown using a selective growth mask. This makes it possible to reduce the number of times of epitaxial growth at the time of manufacture.

Embodiment 5

Figure 19:
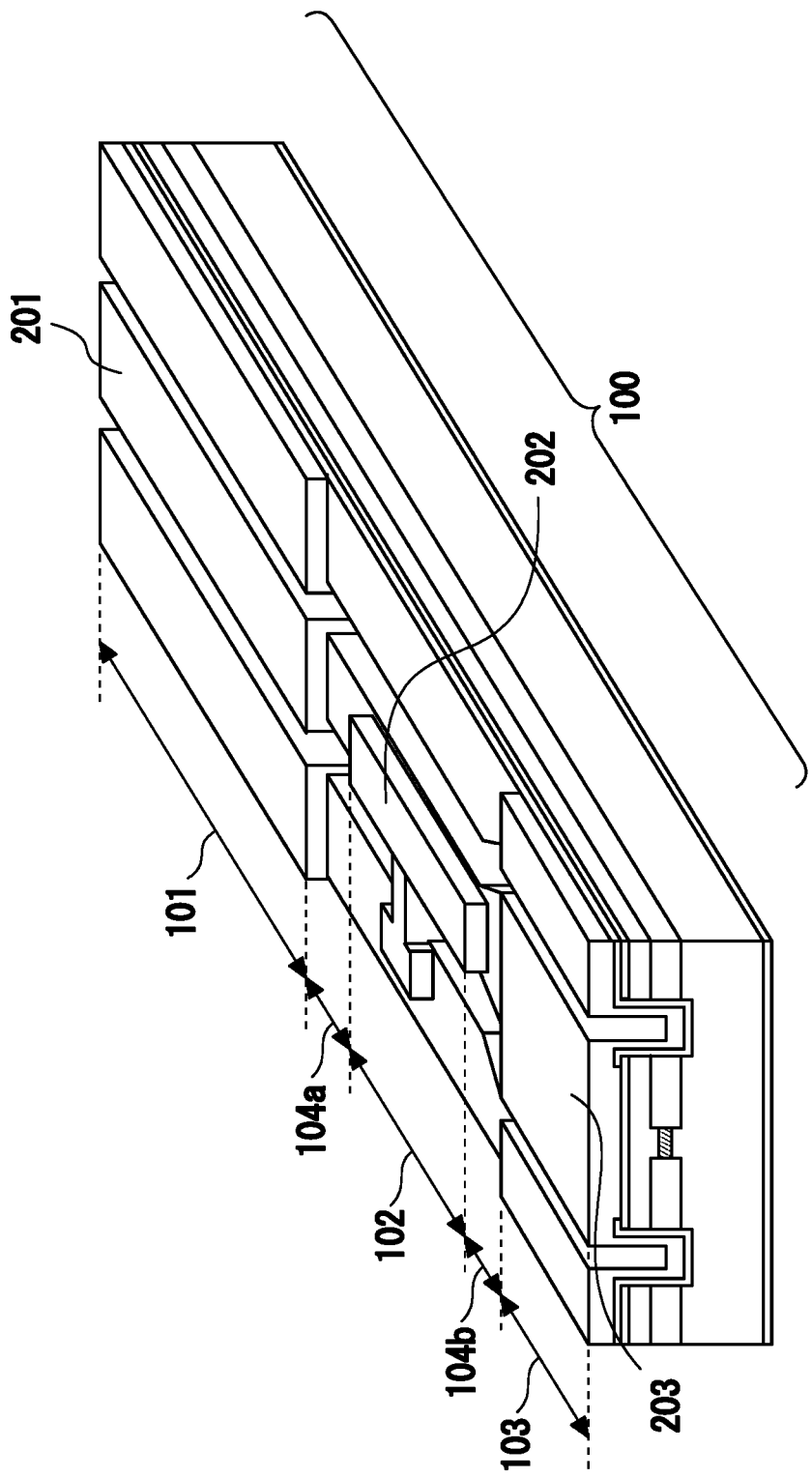
FIG. 19 is a perspective view illustrating a modulator-integrated semiconductor laser according to an embodiment 5.

FIG. 19 is a perspective view illustrating a modulator-integrated semiconductor laser according to an embodiment 5. In the present embodiment, a process mesa width in an optical attenuator 103 is made wider than that in an electro-absorption modulator 102 to improve heat dissipation in the optical attenuator 103. Accordingly, a contact area between a contact layer 33 in the optical attenuator 103 and a front surface electrode 203 is wider than a contact area between a contact layer 23 in the electro-absorption modulator 102 and a front surface electrode 202. This prevents a rise in temperature of a light absorption layer 31 in the optical attenuator 103 due to a photocurrent on the high-temperature side on which a light output is not easily obtained, thereby making it possible to reduce a loss of light.

REFERENCE SIGNS LIST 21 light absorption layer of electro-absorption modulator; 23,33 contact layer; 31 light absorption layer of optical attenuator; 43 thermistor; 44 control unit; 45 look-up table; 100 modulator-integrated semiconductor laser; 101 semiconductor laser; 102 electro-absorption modulator; 103 optical attenuator; 105a,105b transparent waveguide (passive waveguide); 202,203 front surface electrode

The invention claimed is:

1. A semiconductor laser device comprising:
a modulator-integrated semiconductor laser including a semiconductor laser, an electro-absorption modulator, and an optical attenuator that are monolithically integrated, the electro-absorption modulator and the optical attenuator being connected in series in a stage succeeding the semiconductor laser; and
a control unit controlling the DC bias voltage to be applied to the optical attenuator as reverse bias to increase as temperature of the modulator-integrated semiconductor laser rises so that an average light output from an emission end surface of the modulator-integrated semiconductor laser becomes constant regardless of temperature,
wherein DC bias current of the semiconductor laser is constant regardless of temperature,
the control unit reads a bias current value of the semiconductor laser which corresponds to the temperature from a look-up table and sets a bias current of the semiconductor laser to have the read bias current value,
the control unit reads a bias voltage value of the electro-absorption modulator which corresponds to the temperature from the look-up table and sets bias voltage of the electro-absorption modulator to have the read bias voltage value, and
the control unit reads a bias voltage value of the optical attenuator which corresponds to the temperature from the look-up table and sets bias voltage of the optical attenuator to have the read bias voltage value.

2. The semiconductor laser device according to claim 1, wherein the modulator-integrated semiconductor laser has no temperature adjustment device.

3. The semiconductor laser device according to claim 1, further comprising a thermistor detecting the temperature of the modulator-integrated semiconductor laser.

4. The semiconductor laser device according to claim 1, wherein the electro-absorption modulator modulates output light of the semiconductor laser,
the optical attenuator attenuates output light of the electro-absorption modulator, and
output light of the optical attenuator is outputted from an emission end surface of the modulator-integrated semiconductor laser.

5. The semiconductor laser device according to claim 1, wherein the optical attenuator attenuates output light of the semiconductor laser, and
the electro-absorption modulator modulates output light of the optical attenuator,
output light of the electro-absorption modulator is outputted from an emission end surface of the modulator-integrated semiconductor laser.

6. The semiconductor laser device according to claim 1, wherein an absorption end wavelength of a light absorption layer in the optical attenuator is shorter than an absorption end wavelength of a light absorption layer in the electro-absorption modulator.

7. The semiconductor laser device according to claim 1, wherein an area of an electrode in the optical attenuator is wider than an area of an electrode in the electro-absorption modulator.

8. The semiconductor laser device according to claim 1, wherein a bias voltage adjustment range of the optical attenuator is wider than a bias voltage adjustment range of the electro-absorption modulator.

9. The semiconductor laser device according to claim 1, wherein a layer structure of a light absorption layer in the electro-absorption modulator is different from a layer structure of a light absorption layer in the optical attenuator.

10. The semiconductor laser device according to claim 1, wherein a layer structure of a light absorption layer in the electro-absorption modulator is same as a layer structure of a light absorption layer in the optical attenuator.

11. The semiconductor laser device according to claim 1, wherein the modulator-integrated semiconductor laser includes a passive waveguide provided between any two of the semiconductor laser, the electro-absorption modulator, the optical attenuator, and an emission end surface.

12. The semiconductor laser device according to claim 1, wherein a contact area between a contact layer and an electrode in the optical attenuator is wider than a contact area between a contact layer and an electrode in the electro-absorption modulator.

13. A method for manufacturing the semiconductor laser device according to claim 1, wherein a light absorption layer in the optical attenuator and a light absorption layer in the electro-absorption modulator are integrated by butt joint growth.

14. A method for manufacturing the semiconductor laser device according to claim 1, wherein a light absorption layer in the optical attenuator and a light absorption layer in the electro-absorption modulator are simultaneously epitaxially grown using a selective growth mask.

15. A semiconductor laser device comprising:
a modulator-integrated semiconductor laser including a semiconductor laser, an electro-absorption modulator, and an optical attenuator that are monolithically integrated, the electro-absorption modulator and the optical attenuator being connected in series in a stage succeeding the semiconductor laser; and
a control unit controlling the DC bias voltage to be applied to the optical attenuator as reverse bias to increase as temperature of the modulator-integrated semiconductor laser rises so that an average light output from an emission end surface of the modulator-integrated semiconductor laser becomes constant regardless of temperature,
wherein DC bias current of the semiconductor laser is constant regardless of temperature,
the control unit reads a bias current value of the semiconductor laser which corresponds to a photocurrent following through the optical attenuator from a look-up table and sets a bias current of the semiconductor laser to have the read bias current value,
the control unit reads a bias voltage value of the electro-absorption modulator which corresponds to the photocurrent from the look-up table and sets bias voltage of the electro-absorption modulator to have the read bias voltage value, and
the control unit reads a bias voltage value of the optical attenuator which corresponds to the photocurrent from the look-up table and sets bias voltage of the optical attenuator to have the read bias voltage value.

16. The semiconductor laser device according to claim 15, wherein the modulator-integrated semiconductor laser has no temperature adjustment device.

17. The semiconductor laser device according to claim 15, further comprising a thermistor detecting the temperature of the modulator-integrated semiconductor laser.

18. A method for manufacturing the semiconductor laser device according to claim 15, wherein a light absorption layer in the optical attenuator and a light absorption layer in the electro-absorption modulator are integrated by butt joint growth.

19. A method for manufacturing the semiconductor laser device according to claim 15, wherein a light absorption layer in the optical attenuator and a light absorption layer in the electro-absorption modulator are simultaneously epitaxially grown using a selective growth mask.

* * * * *